3,695,889
EMULSIFIER SYSTEM FOR SUBSTITUTE DAIRY PRODUCTS
Philip F. Ingerson, Merced, Calif., assignor to Avoset Food Corporation, Oakland, Calif.
No Drawing. Filed June 5, 1970, Ser. No. 43,966
Int. Cl. A23c 11/00
U.S. Cl. 99—63                                    8 Claims

ABSTRACT OF THE DISCLOSURE

An emulsifier system useful in non-whipping type substitute food and dairy products which contain a higher ratio of polyunsaturated fats to saturates. The system comprises in combination polysorbate 60, propylene glycol monostearate, and a fatty acid lactylate alkali metal salt.

---

The present invention relates to an emulsifier system to be employed primarily in substitute food and dairy products containing polyunsaturated fats. More specifically, the invention relates to an emulsifier system which permits for a higher ratio of polyunsaturates to saturates in substitute food and dairy products than has been previously possible.

It has been demonstrated in the prior art that the addition of vegetable oils and fish oils containing a high percentage of unsaturated fatty acids to the diet causes a decrease in plasma cholesterol levels. When saturated fractions such as lard, butter and meats were added to the diet, the serum cholesterol rose. These elevated serum cholesterol levels are associated with atherosclerosis. The cholesterol esters of normal plasma are approximately 85% unsaturated while the cholesterol esters found in atherosclerotic plaque are largely saturated. The administration of unsaturated fatty acids changes the esterification of cholesterol toward the normal type of esters which are then less suitable for deposition on the aortic walls and are more easily metabolized and more soluble in the blood.

For these reasons and upon the recommendation on the American Heart Association, food and dairy companies involved in the so-called saturated fat market, i.e., hydrogenated cooking fat, lard, margarine, are expanding research for means to modify their present products so as to increase the safety and acceptance of such foods. The main objective of this research has been to produce substitute food and dairy products such as, for example, non-dairy creamers, filled milk and milk shakes, having a higher ratio of polyunsaturates to saturates than are presently available. In the case of commercially available substituted dairy products, the fat equivalent of butter is generally replaced by hydrogenated vegetable fats such as present in coconut and palm kernel oils. These oils are composed of mostly saturated higher fatty acids and are therefore still unsatisfactory. The reason for using vegetable oils containing the saturated fatty acids is because these acids are stable and the oils remain bland and edible for several years under ordinary storage conditions. This high level of saturation has also been necessary in order to protect the flavor of these substitute products during processing which involves the application of relatively high temperatures.

Attempts have therefore been made, particularly in the dairy industry, to incorporate higher levels of poly-unsaturated fats into formulations which contain relatively high levels of total fat, i.e., to increase the ratio of poly-unsaturates to saturates. These attempts have most often failed because emulsion systems which contain the relatively unstable polyunsaturated acids experience oxidated flavor changes when exposed to high temperatures or upon standing over a period of time. The temperature employed during the processing of the substitute dairy products is sufficiently high to bring about such flavor changes. This particular instability is the main reason that manufacturers have not been successful in substituting polyunsaturated fats for saturated fats in preparing non-dairy or substitute food products on a practical commercial basis.

It is therefore the object of this invention to provide an emulsifier system which will stabilize and maintain the flavor of polyunsaturated fats during processing.

It is a further object of this invention to provide substitute food and non-dairy products having a higher percentage of polyunsaturates than presently available products and which will maintain flavor and general stability over a prolonged period of time.

The non-dairy products of this invention are generally of the non-whipping type such as, for example, filled milk, non-dairy creamer cereal blends, and milk shakes. Their consistency is fluid rather than stiff or self-supporting.

The novel emulsifier system of this invention comprises a combination of three ingredients—polysorbate 60, propylene glycol monostearate and a fatty acid lactylate salt. It has been unexpectedly discovered that the combination of these compounds provides for a palatable and stable preparation containing a high degree of polyunsaturates. This combination of ingredients was found to stabilize polyunsaturated fats present in substitute food and non-dairy products when they were subjected to high temperatures such as required during processing and manufacture. Further, this emulsifier system permits substitute dairy products to maintain the bland flavor of the unsaturated fats over an extended period of time.

A further advantage of employing the emulsifier system of this invention is that it fully and uniformly incorporates a liquid fat in an oil and water emulsion. This results in an emulsion system which when homogenized will prevent fat creaming.

It has also been discovered that all three additives must be present in combination in order to achieve the advantages of stability and palatability noted above. If only one or two of the additives are employed, it results in a loss of emulsion stability. For example, a loss of the unsaturated fat flavor present in the oils resulted upon heating. Further, the flavor of the emulsifiers came through and a fat creaming was evident. Only when the additives are used in combination does the suspension result in the described stable preparation.

Preferably, the compounds will be present in the oil-water emulsion in an approximate 1:2:1 ratio of polysorbate 60 to propylene glycol monostearate to the fatty acid lactylate salt. The total concentration of these ingredients will be in an amount of from about 2% to about 20% of the total oil present. Most advantageously, the total concentration of the above emulsifiers will be present in an amount of from about 3.0% to about 9.0% of the total oil present.

When the emulsifier system as described above is employed, a much higher ratio of polyunsaturates to saturates than has been previously possible can be incorporated in substituted food and dairy products. For example, a novel non-diary creamer cereal blend employing the emulsifier system of this invention compares with commercially available non-diary creamers and half and half dairy cream as follows:

|  | Polyunsaturates percent | Saturates, percent | Ratio |
| --- | --- | --- | --- |
| Commercially available non-dairy creamers | 0.2 | 97.1 | 0.002 |
| Half and half | 3.1 | 62.2 | 0.05 |
| Non-dairy creamer of this invention | 25.0 | 25.0 | 1.0 |

It can be seen from the above that the non-dairy creamer of this invention has a 500 times greater ratio of polyunsaturates to saturates than the commercially available non dairy creamers.

The term lactylate salt is an art recognized term and may be, for example, a mono or divalent cation alkali metal salt of a fatty acid ester having the following formula:

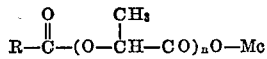

in which:

$n$ is from 2 to 4,

RCO represents an acyl radical of a fatty acid from 12 to 24 carbon atoms inclusive, and Me is a mono or divalent cation alkali metal salt especially sodium, potassium or calcium.

The preferred lactylate salts of the emulsifier system of this invention are the sodium or calcium salts of the following: stearyl-2-lactylate, palmityl-3-lactylate, myristyl-3-lactylate, linoleyl-2-lactylate, oleyl-2-lactylate or arachidyl-2-lactylate. This ingredient is critical to the invention.

Most advantageously the lactylate salt of this invention is sodium stearyl-2-lactylate having the following formula:

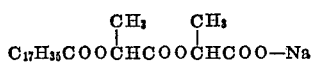

The second ingredient, polysorbate 60, referred to in the novel emulsifier system of this invention is polyoxyethylene(20) sorbitan monostearate (Federal Register 26, 7733). This product is also available under the trade name of "Tween 60." Other equivalent polymers of polyoxyethylene sorbitan fatty acid esters, such as, for example, those derived from lauric, myristic, palmitic, or oleic acids, may also be employed.

The third ingredient of the novel emulsifier system of this invention is a propylene glycol monoester, propylene glycol monostearate. It is to be understood that other propylene glycol monoesters having equivalent fatty acid moieties such as, for example, palmitic, lauric, or myristic can also be used in this invention.

The polyunsaturated fats to be incorporated in the substitute diary and food products of this invention are generally derived from vegetable oils containing a high percentage of unsaturated fatty acids. These fats are nontoxic liquid vegetable fats composed of glyceryl esters of unsaturated higher fatty acids such as, for example, oleic, linoleic and linolenic acids. The vegetable oils containing these unsaturated fatty acids would be, for example, cottonseed oil, peanut oil, olive oil, corn oil, and soybean oil. Any other nontoxic vegetable oil containing a relatively high percentage of unsaturated fatty acids may be employed in this invention.

The vegetable oils may be used either singly or in combination and are present in an amount of from about 1.0% to about 50.0% of the emulsion. Preferably the vegetable oils will be present in an amount of from about 2.0% to about 20.0% of the emulsion.

The above non-dairy emulsion products are made following the techniques described hereafter. When necessary, any desired pharmaceutically compatible adjuvant used in liquid preparations by those skilled in the art may be employed. For example, preservatives such as methylparaben or propylparaben, flavoring agents such as oil of orange, lemon-lime, raspberry, cola, mint, chocolate, vanilla or combinations of these flavors and coloring agents such as $\beta$-carotene and other certified food colors may be used.

The invention will be further clarified by the following specific examples. These examples are not limiting but are used to make obvious to one skilled in the art the full practice of this invention.

EXAMPLE 1

Filled milk

| Ingredients: | Amounts, percent |
| --- | --- |
| Polysorbate 60 | 0.10 |
| Propylene glycol monostearate | 0.20 |
| Sodium stearoyl-2-lactylate | 0.10 |
| Mixed vegetable oils (peanut-cottonseed) | 3.50 |
| Skim milk | 96.10 |

The polysorbate 60, propylene glycol monostearate and sodium stearoyl-2-lactylate are added to the skim milk and mixed. The vegetable oils are added with continued agitation. The mixture is then processed by heat treating and sterilizing at a temperature of approximately 295° F. The mixture is homogenized at an approximate pressure of 3000 p.s.i.g. and at a temperature of between 150° to 190° F. The processed product is then cooled and packaged.

EXAMPLE 2

Non-dairy cereal blend

| Ingredients: | Amounts, percent |
| --- | --- |
| Di-potassium phosphate | 0.20 |
| Sodium caseinate | 1.60 |
| Sucrose | 1.00 |
| Polysorbate 60 | 0.15 |
| Sodium stearoyl-2-lactylate | 0.15 |
| Propylene glycol monostearate | 0.30 |
| Peanut oil | 5.00 |
| Cottonseed oil | 5.00 |
| Water | 86.60 |

The di-potassium phosphate, sodium caseinate, sucrose, polysorbate 60, stearoyl lactylate, and propylene glycol monostearate are added to the water and mixed. The vegetable oils are then added and all the ingredients are thoroughly dispersed. The mixture is then heat treated, sterilized at a temperature of approximately 295° F. and processed. The mixture is homogenized at an approximate temperature of between 150° to 190° F. and a pressure of about 3000 p.s.i.g. The processed product is then cooled and packaged.

EXAMPLE 3

Milk shake

| Ingredients: | Amounts, percent |
| --- | --- |
| Polysorbate 60 | 0.20 |
| Propylene glycol monostearate | 0.40 |
| Sodium stearoyl-2-lactylate | 0.20 |
| Mixed vegetable oils | 5.00 |
| Sugar | 6.20 |
| Carrageenan | 0.10 |
| Vanilla flavor | 0.50 |
| Skim milk | 87.40 |

The polysorbate 60, propylene glycol monostearate, sodium stearoyl-2-lactylate, sugar and carrageenan are added to the skim milk and mixed. The vegetable oils and flavor are then added and all of the ingredients are thoroughly agitated. The mixture is then heat treated, sterilized at a temperature of approximately 295° F. and processed. The mixture is homogenized at an approximate temperature of between 150° to 190° F. The processed product is then cooled and packaged.

EXAMPLE 4

| Ingredients: | Amounts, percent |
|---|---|
| Di-potassium phosphate | 0.20 |
| Sodium caseinate | 1.00 |
| Sucrose | 1.50 |
| Polysorbate 80 (polyoxyethylene(20) sorbitan mono-oleate) | 0.20 |
| Calcium stearoyl-2-lactylate | 0.20 |
| Propylene glycol monostearate | 0.40 |
| Soybean oil | 8.50 |
| Corn oil | 9.00 |
| Water | 79.00 |

The di-potassium phosphate, sodium caseinate, sucrose, polysorbate 80, stearoyl lactylate and propylene glycol monostearate are added to the water and mixed. The oils are then added with continued agitation. The mixture is then processed by heat treating and sterilizing at a temperature of approximately 295° F. The mixture is homogenized at about a pressure of 3000 p.s.i.g. and at a temperature of between 150° to 190° F. The processed product is then cooled and packaged.

I claim:

1. A substitute dairy product containing a high proportion of polyunsaturated fats selected from the group consisting of a non-dairy creamer cereal blend, filled milk or milk shake, said product comprising from about 1% to about 50% of a nontoxic vegetable oil composed of glyceryl esters of unsaturated higher fatty acids and an emulsifier system comprising in combination polysorbate 60, propylene glycol monostearate and a fatty acid lactylate alkali metal salt in the ratio of about 1:2:1, and said emulsifier system being present from about 2 to about 20% of the total oil present.

2. The substituted dairy product of claim 1 in which the fatty acid lactylate salt is sodium stearoyl-2-lactylate or calcium stearoyl-2-lactylate.

3. A non-dairy creamer cereal blend having a high concentration of polyunsaturated fats comprising water, from about 1% to about 50% of a nontoxic vegetable oil composed of glyceryl esters of unsaturated higher fatty acids, sodium caseinate, and an emulsifier system comprising in combination polysorbate 60, propylene glycol monostearate and a fatty acid lactylate alkali metal salt in the ratio of about 1:2:1, and said emulsifier system being present from about 2 to about 20% of the total oil present.

4. The cereal blend of claim 3 wherein the vegetable oils are selected from the group consisting of cottonseed oil and peanut oil.

5. The cereal blend of claim 3 in which the fatty acid lactylate salt is sodium stearoyl-2-lactylate or calcium stearoyl-2-lactylate.

6. A filled milk product having a high proportion of polyunsaturated fats comprising skim milk, from about 1% to about 50% of a nontoxic vegetable oil composed of glyceryl esters of unsaturated higher fatty acids, and an emulsifier system comprising in combination polysorbate 60, propylene glycol monostearate and a fatty acid lactylate alkali metal salt in the ratio of about 1:2:1, and said emulsifier system being present from about 2 to about 20% of the total oil present.

7. The filled milk product of claim 6 in which the fatty acid lactylate salt is sodium stearoyl-2-lactylate or calcium stearoyl-2-lactylate.

8. The substitute dairy product of claim 1 wherein said product is a milk shake.

References Cited
UNITED STATES PATENTS

| 3,488,198 | 1/1970 | Bundus | 99—63 |
|---|---|---|---|
| 3,223,532 | 12/1965 | Pinkalla et al. | 99—123 |
| 3,228,772 | 1/1966 | Buddenmeyer et al. | 99—94 |
| 3,563,761 | 2/1971 | Ellinger | 99—63 |

JOSEPH M. GOLIAN, Primary Examiner

D. M. NAFF, Assistant Examiner

U.S. Cl. X.R.

99—54, 60